US008175971B1

(12) United States Patent
Landry

(10) Patent No.: US 8,175,971 B1
(45) Date of Patent: May 8, 2012

(54) LIFETIME GUARANTEED INCOME RIDER

(75) Inventor: Peter J. Landry, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 366 days.

(21) Appl. No.: 12/344,668

(22) Filed: Dec. 29, 2008

(51) Int. Cl.
*G06Q 40/00* (2012.01)
(52) U.S. Cl. .............................. 705/40; 705/36 R; 705/4
(58) Field of Classification Search ........................ None
See application file for complete search history.

(56) References Cited

U.S. PATENT DOCUMENTS

2006/0085338 A1* 4/2006 Stiff et al. ......................... 705/40
2008/0077519 A1* 3/2008 Pedersen et al. ............. 705/36 R

OTHER PUBLICATIONS

"Phoenix Wealth Management: Stand Alone Living Benefits" (http://www.phoenixwm.phl.com/public/products/ars/salb/index.jsp), The Phoenix Companies, Inc., East Greenbush, New York, Dec. 28, 2008.

"Lifeharbor Guaranteed Income Solution" (www.genworthwealth.com/files/CM_LH_2008_06.pdf), Genworth Financial, Inc., Richmond, Virginia, May 9, 2008.

* cited by examiner

*Primary Examiner* — Jason M Borlinghaus
(74) *Attorney, Agent, or Firm* — Weiss & Arons LLP; Michael Springs

(57) ABSTRACT

Apparatus and methods for providing to a bank customer a guaranteed retirement distribution based on a retail bank product. An electronic processing module may be used to identify a value of an asset in a retail banking product and calculate a guaranteed distribution payment amount. The guaranteed distribution payment amount may be based on the asset value. An electronic transmitter may be used to provide to an insurance carrier a data object having an attribute that corresponds to the asset value. A new guaranteed distribution amount may replace a previous guaranteed distribution amount. The new guaranteed distribution amount may be based on a new value of the asset. The asset may be retained in the retail banking product and the insurance carrier may issue a policy that guarantees the distribution payment to the customer.

19 Claims, 3 Drawing Sheets

LIFETIME GUARANTEED INCOME RIDER

FIELD OF TECHNOLOGY

Aspects of the disclosure relate to providing apparatus and methods for providing guaranteed retirement distribution income. In particular, the disclosure relates to apparatus and methods for providing guaranteed retirement distribution income based on assets held in consumer banking products.

BACKGROUND

An individual that is contemplating retirement is typically concerned about financing his retirement years. Through scientific enhancements and medical advances, the individual may live longer than expected. For many retirees today the prospect of outliving financial resources is very real.

Annuity products can provide the individual with level distributions in retirement. Typically, annuities are provided by financial institutions as stand-alone products. As such, the individual would manage his own assets through an accumulation phase and a distribution phase. Amounts available for distribution are uncertain because funds are subject to market performance.

One known approach to overcoming the uncertainty is a "minimum withdrawal feature" that may be available as an annuity product rider. When a minimum withdrawal feature is used, assets must be invested, typically, in vehicles that are selected by a third party insurance company that provides the annuity product. The third party insurance company often provides the annuity product as an insurance benefit under an insurance policy. To attenuate risk, the third party insurance company may govern the individual's choice of investment vehicles. Minimum withdrawal features are expensive. Also, the third party insurance company may be entitled to charge an early-termination fee to penalize the individual for changing investment vehicles.

Consumers of retail banking products and services are an untapped market for the sale of annuity products. This is because the benefits, liabilities and fees associated with annuity products and minimum withdrawal features are often confusing and difficult to promote to such consumers.

For example, a financial institution customer may purchase an annuity product that carries a surrender period penalty. The penalty may range from one to several years. The penalty may depend upon the type of shares purchased. The customer's assets typically must be moved outside of the financial institution to a third party insurance carrier. The customer may then manage the investment of the assets within mutual funds selected by the insurance carrier. The customer may then choose to add a lifetime guaranteed minimum withdrawal benefit feature to the annuity product (the "base annuity" or "base annuity product").

Typically, adding the minimum withdrawal benefit feature is expensive. The base annuity and the lifetime guaranteed minimum withdrawal benefit feature typically costs the customer over 300 basis points (3% of asset value) annually. The customer may also pay fees associated with the mere investment of the assets. The expense of the minimum withdrawal benefit feature, coupled with the complexity of the annuity product's design, deters customers from purchasing the product and decreases the value of the product to the financial institution.

FIG. 1 shows typical process 100 by which a customer may obtain an annuity product. Process 100 begins at step 102. At step 102, the customer meets with a financial advisor to discuss retirement income distribution. At step 104, the financial advisor and the customer determine whether the income strategy adequately addresses the possibility that the customer will outlive his assets (a "longevity issue"). If at step 104 it is determined that the income strategy adequately addresses longevity issues, process 100 continues at step 106. At step 106, the customer continues with the existing accumulation/distribution strategy.

If at step 104 it is determined that the income strategy does not adequately address longevity issues, process 100 continues at step 108. At step 108, the customer may purchase an annuity with a lifetime income guarantee feature. The lifetime income guarantee feature costs the customer about 300 basis points (based on the value of the underlying investment) per year. The annuity and the guarantee are administered by an insurance company.

At step 110, the customer transfers assets to the insurance company. At step 112, the customer (along with the financial advisor) selects one or more of the insurance company's investment options as investment vehicles for the assets. At step 114, the customer begins taking retirement income distributions. If the customer takes distribution of all the assets prior to his death, process 100 continues at step 116. At step 116, the insurance company's annuity product makes payments to the customer in place of the distributions from the assets.

If the customer dies before taking complete distribution of the assets (and interest), process 100 continues at step 118. At step 118, the customer's beneficiaries receive the remaining assets (and interest).

As a result of the aforementioned drawbacks, many financial institution customers keep large portions of their retirement income in traditional retail banking products like certificates of deposit and savings accounts. Such banking products are FDIC insured. FDIC insurance provides protection against risk, but the banking products require such customers to sacrifice possible higher rates of return and lack guaranteed income features. The sacrifice of higher rates of returns increases the likelihood that the customer will outlive his retirement savings. Investment in such products also requires overcoming the frequent challenge of shopping for the best rate in the marketplace.

It would be desirable, therefore, to provide apparatus and methods for providing financial products that are based on retail banking assets and provide guaranteed distributions during the life of a banking customer.

SUMMARY OF THE INVENTION

It is an object of the invention to provide apparatus and methods for providing to a bank customer a guaranteed retirement distribution based on a retail bank product. In accordance with the principles of the invention, apparatus and methods for providing to a bank customer a guaranteed retirement distribution based on a retail bank product are provided. The apparatus and methods may involve using an electronic processing module to identify a value of an asset in a retail banking product and calculate a guaranteed distribution payment amount. The guaranteed distribution payment amount may be based on the asset value. The apparatus and methods may further involve using an electronic transmitter to provide to an insurance carrier a data object having an attribute that corresponds to the asset value. The insurance company may use information about the asset value for actuarial purposes or any other suitable purpose. A new guaranteed distribution amount may replace a previous guaranteed distribution amount. The new guaranteed distribution amount may be based on a new value of the asset. The asset may be retained in the retail banking product and the insurance carrier may issue a policy that guarantees the distribution payment to the customer.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
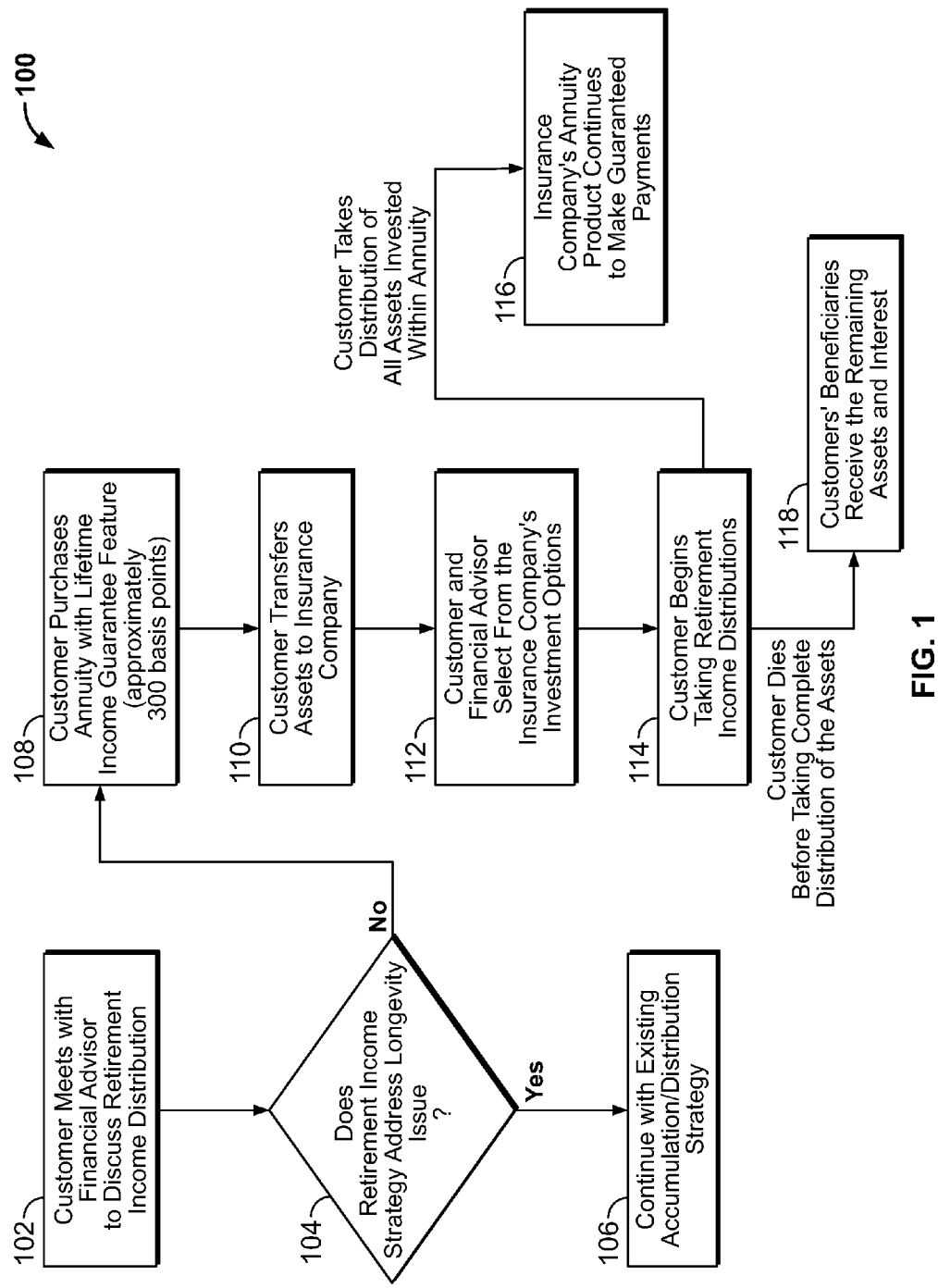
FIG. 1 shows a conventional process for providing guaranteed retirement income.

In accordance with the principles of the invention, apparatus and methods for providing to a bank customer a guaranteed retirement distribution based on a retail bank product are provided. The apparatus and methods may involve using an electronic processing module to identify a value of an asset in a retail banking product and calculate a guaranteed distribution payment amount. The retail banking product may be used for accumulating funds for distribution in retirement.

The guaranteed distribution payment amount may be based on the asset value. Distribution payments may be scheduled by the customer. The apparatus and methods may further involve using an electronic transmitter to providing to an insurance carrier a data object having an attribute that corresponds to the asset value. A new guaranteed distribution amount may replace a previous guaranteed distribution amount. The new guaranteed distribution amount may be based on a new value of the asset. The asset may be retained in the retail banking product and the insurance carrier may issue a policy that guarantees the distribution payment to the customer. The apparatus may include a fulfillment platform that processes distribution payment instructions and initiates transfers of funds to the customer.

The guaranteed retirement distribution based on a retail bank product may be implemented in the form of a lifetime guaranteed income rider product. The lifetime guaranteed income rider product may be used in conjunction with a retail banking product. The use of the lifetime guaranteed income rider in conjunction with the retail banking product provides advantages of the accumulation phase (e.g., simplicity for the customer) along with advantages of the distribution phase (e.g., certainty for the customer).

The rider product may also be advantageous for the financial institution. For example, expenses associated with the annuity may be decreased, because active management of the underlying deposit or investment product would reside with the bank. Also, the expense associated with any collateral (e.g., marketing) or on-going support (e.g., customer service) may be reduced, because the retail banking product may have it's own marketing and customer service channels. In some embodiments, a hedging strategy (e.g., one that is employed by the insurance carrier to manage risk associated with the guarantee) may be the primary expense (other than fees or expenses required in connection with the ownership of the underlying banking product) that is passed along to the consumer.

Furthermore, providing an annuity product to the mass consumer marketplace may help compensate for the elimination of many employer-sponsored pension plans.

While the focus of this solution is upon retirement income asset accumulation and distribution, there is the potential for similar protection/insurance product applications within the consumer credit space as well. For example, providing equity value guarantees to homeowners to guard against decreasing real estate prices. This invention disclosure document captures the distribution management of assets throughout retirement, but protecting exposure to adverse market conditions which would effect instruments distributed by the bank (such as the aforementioned mortgage scenario) is another option.

For asset accumulation, the consumer may select one or more retail banking products with which he is comfortable and familiar to begin accumulating retirement funds. Such banking products may include a brokerage account, a "Keep the Change®" account, a Certificate of Deposit, Reverse Mortgage assets, Credit Card Reward Account Balances, as well as Savings Accounts. In some embodiments, the customer may choose to apply the rider product to a deposit and/or a brokerage product. The customer may do so while maintaining the assets at the financial institution. In some embodiments, the customer may withdraw some or all of the assets in the retail banking product without a financial penalty. The withdrawal of assets may reduce the amount of funds entitled to a guarantee.

In the distribution phase of the lifetime income guarantee, customers initially receive a return of deposit or brokerage account value in a recurring, structured value/amount (typically 5% and based upon the value of the account when retirement income distributions begin). The distributions usually can begin as early as age 59½, which addresses concerns regarding premature distributions from qualified accounts. Any growth normally credited to the underlying deposit or brokerage product, interest for example, continues to be applied, and should the value of the underlying product increase above the account value at the time of initial income distributions, the client can then increase the base value for all subsequent 5% distributions.

Increases typically take effect at contract anniversary and may be based upon the value of the underlying deposit or brokerage product. Customers then can continue to receive the 5% distributions throughout retirement, and when the value of their underlying deposit or brokerage product reached zero all subsequent 5% distributions are made by the annuity product itself. It's important to note that there is a cost associated with the annuity product, and it can range anywhere from approximately 50 to 150 basis points (higher for coverage of two life spans, e.g., for a couple) dependent upon the inherent risk associated with the deposit or brokerage product.

By using the guaranteed distribution payment of invention along with a retirement accumulation goal, a customer can track his progress with the knowledge that he has a minimum guaranteed income for his entire retirement.

The apparatus and methods of the invention may involve the exchange of data between several of the bank's business units and one or more third party insurance carriers on a daily basis. This is to provide data on the value of the underlying deposit or brokerage product, as well as withdrawal information. Reporting and operational systems may receive information for the preparation of customer statements.

Table 1 shows an illustrative scenario in which a customer uses a retail banking asset as the basis for a guaranteed income. At inception, the customer applies for and obtains a lifetime guaranteed income rider on a retail banking product. The lifetime guaranteed income rider may be provided by an insurance carrier to the customer, but the retail banking asset is not transferred to the insurance carrier.

The retail banking product may be any suitable banking product. For example, the retail banking product may be an individual retirement account ("IRA"), a managed money account, a certificate of deposit, a reverse mortgage asset, a credit card rewards accumulation account, a Keep-the-Change® account, a savings account or any other suitable account. In the Table 1 scenario, the account has a value of $1,000,000. The rider guarantees that future distributions will be 5% of the retail account value. The actual retail account value that is used for the basis of the distribution computation may be the highest value that the retail account reaches after inception.

The rider may guarantee to the customer an annual income based on the retail account value without requiring that the funds in the retail account be transferred out of the retail account.

The rider may require that the customer pay a fee in exchange for the guaranteed income. The fee may be paid out of the retail account value. The retail account may be maintained by the financial institution that originally provided the retail account to the customer. The financial institution bears collateral expenses associated with marketing and servicing such a retail account. When the financial institution offers the customer a guaranteed income rider, the financial institution bears a marginally higher collateral expense. The marginally higher collateral expense may be passed along, in whole or in part, to the customer in the form of fees for the rider.

In contrast, a guaranteed income rider provided by a third party may bear greater collateral costs in connection with the income rider product, because the third party generally markets and services the rider product by itself, not as a supplement to an existing product. The third party may pass along the collateral expense, in whole or in part, to the customer in the form of fees for the rider. But, the fees passed along by the third party will generally be greater than the fees passed along by the financial institution that provides the rider on funds that it already maintains.

TABLE 1

Lifetime guaranteed distribution rider scenario.

| Time | Event | Retail account value* | Future guaranteed distribution |
|---|---|---|---|
| Inception | Customer applies for and obtains rider to guarantee 5% distribution based on retail account value | $1,000,000 | $50,000 |
| Distribution Year 1 | Customer takes guaranteed distribution ($50,000.00) | $1,150,000 | |
| | Retail account value increases (+20%) | $1,200,000 | |
| | Future guaranteed distribution recalculated (5% of $1,150,000.00) | | $57,500 |
| Distribution Year 2 | Customer takes guaranteed distribution ($57,500) | $862,500 | |
| | Retail account value decreases (−20%) | $920,000 | |
| | Guaranteed distribution held at "high-water mark (5% of $1,150,000.00)" | | $57,500 |
| Distribution Year X | Customer takes guaranteed distribution ($57,500) | $0 | |
| | Distributions fully exhaust account | $0 | |
| | Guaranteed distribution held at "high-water mark (5% of $1,150,000.00)" | | $57,500 |

TABLE 1-continued

Lifetime guaranteed distribution rider scenario.

| Time | Event | Retail account value* | Future guaranteed distribution |
|---|---|---|---|
| Distribution Years X + i for life of customer | No change in account value Guaranteed distribution held at "high-water mark (5% of $1,150,000.00)" | $0 | $57,500 |

*Account value may be subject to administrative charges such as service fees. In some embodiments, service fees may be charged at a rate of 50-150 basis points, based on account value, per annum. In some embodiments, the rate may be lower than 50 basis points/ann. In some embodiments, the rate may be higher than 150 basis points/ann.

Distribution Year 1 is the first year in which the customer takes a distribution under the rider. The distribution is calculated as 5% of the original retail account value. In some embodiments, the Year 1 distribution may be calculated as 5% of a different value of the retail account. For example, the Year 1 distribution may be calculated as 5% of the highest retail account value between inception and Year 1. The distribution is drawn against the retail account. Table 1 shows that in the scenario, the value of the account increased during Year 1. The increase may be based on deposits, returns on investment or other factors. The guaranteed distribution amount is reset to 5% of the increased retail account value.

In Distribution Year 2, the customer takes a distribution in the amount of the current guarantee—which is based on the increased retail account value. Table 1 shows that in the scenario, the value of the account decreased during Year 2. The decrease may be based on withdrawals, loans, losses on investment or other factors. Future guaranteed distribution amounts are retained at 5% of the increased retail account value. Any suitable limits may be placed on the withdrawals and loans.

In Distribution Year X (a year after Distribution Year 2), the customer takes a distribution in the amount of the current guarantee—which is based on the highest retail account value attained to date. Table 1 shows that in the scenario, the Distribution Year X distribution, along with any decrease in retail account value and any annual fees, exhausts the retail account of all remaining funds. Under the guaranteed income rider, the customer takes a guaranteed distribution based on the highest retail account value.

In some embodiments a target retail account value may be identified. Distribution Year X may begin when the retail account value falls below the target retail account value. In some embodiments, the target retail account value may be based on one or more of the current guaranteed distribution amount, service fees, market conditions or any other suitable factors.

In Distribution Years X+i, which range from Distribution Year X+1 to the year in which the customer dies, the retail account value remains at $0. The customer takes a guaranteed distribution based on the highest retail account value.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
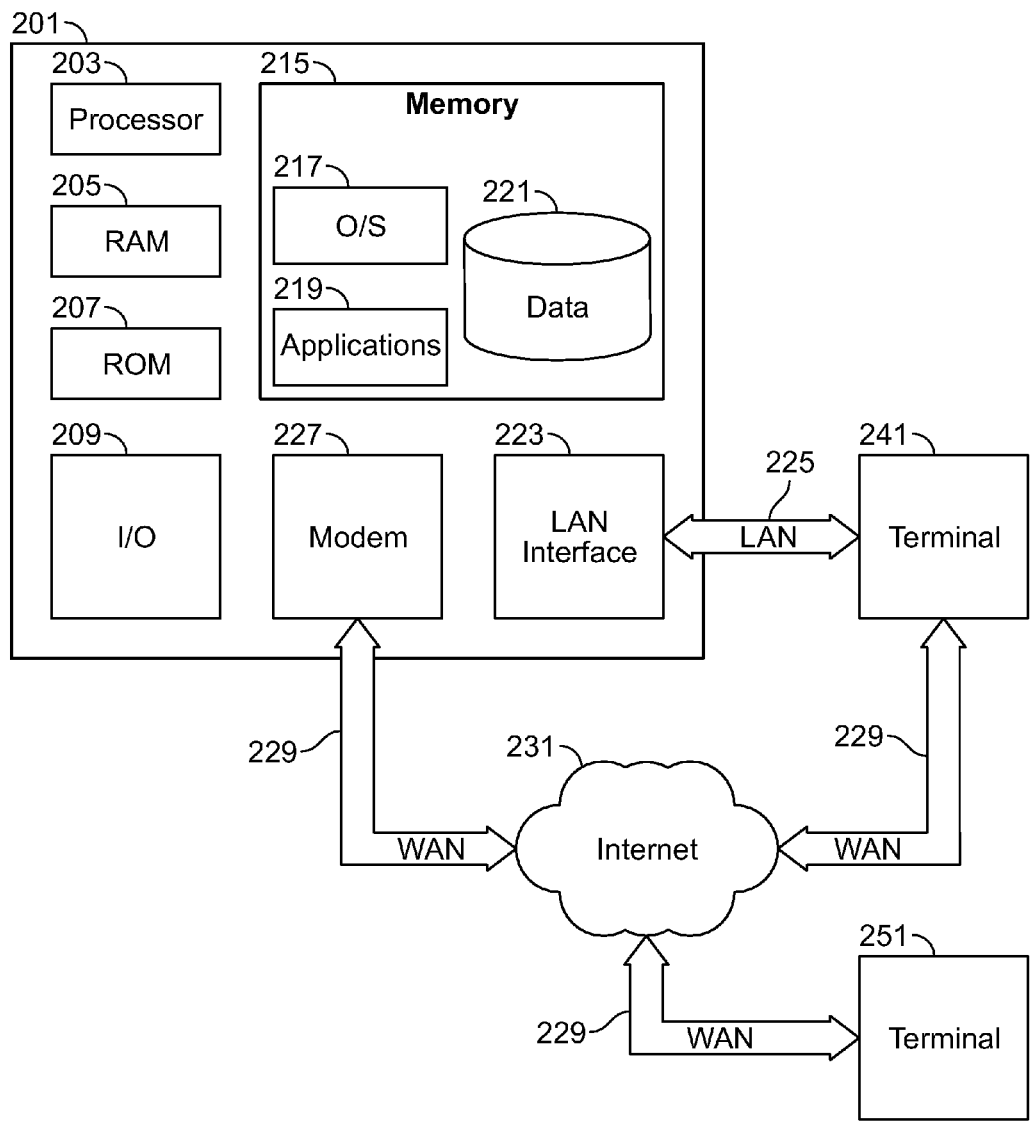
FIG. 2 schematically shows illustrative apparatus that may be used in accordance with the principles of the invention.

FIG. 2 is a block diagram that illustrates a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 225.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 225 and/or storage to provide instructions to processor 203 for enabling server 201 to perform various functions. For example, memory 225 may store software used by server 201, such as an operating system 217, application programs 219, and an associated database 221. Alternatively, some or all of server 201 computer executable instructions may be embodied in hardware or firmware (not shown). Database 221 may provide storage for customer data, customer account data, insurer information, insurance information, payment records and any other suitable information.

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 223. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, cell phone, blackberry, or any other suitable device for storing, transmitting and/or transporting relevant information.

Any information described above in connection with database 221, and any other suitable information, may be stored in memory 225.

One or more of applications 219 may include one or more algorithms that may be used to enroll customers in a guaranteed distribution payment program, calculate guaranteed distribution payment amounts, calculate guaranteed distribution payment fees and perform any other suitable tasks related to risk/benefit analysis.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
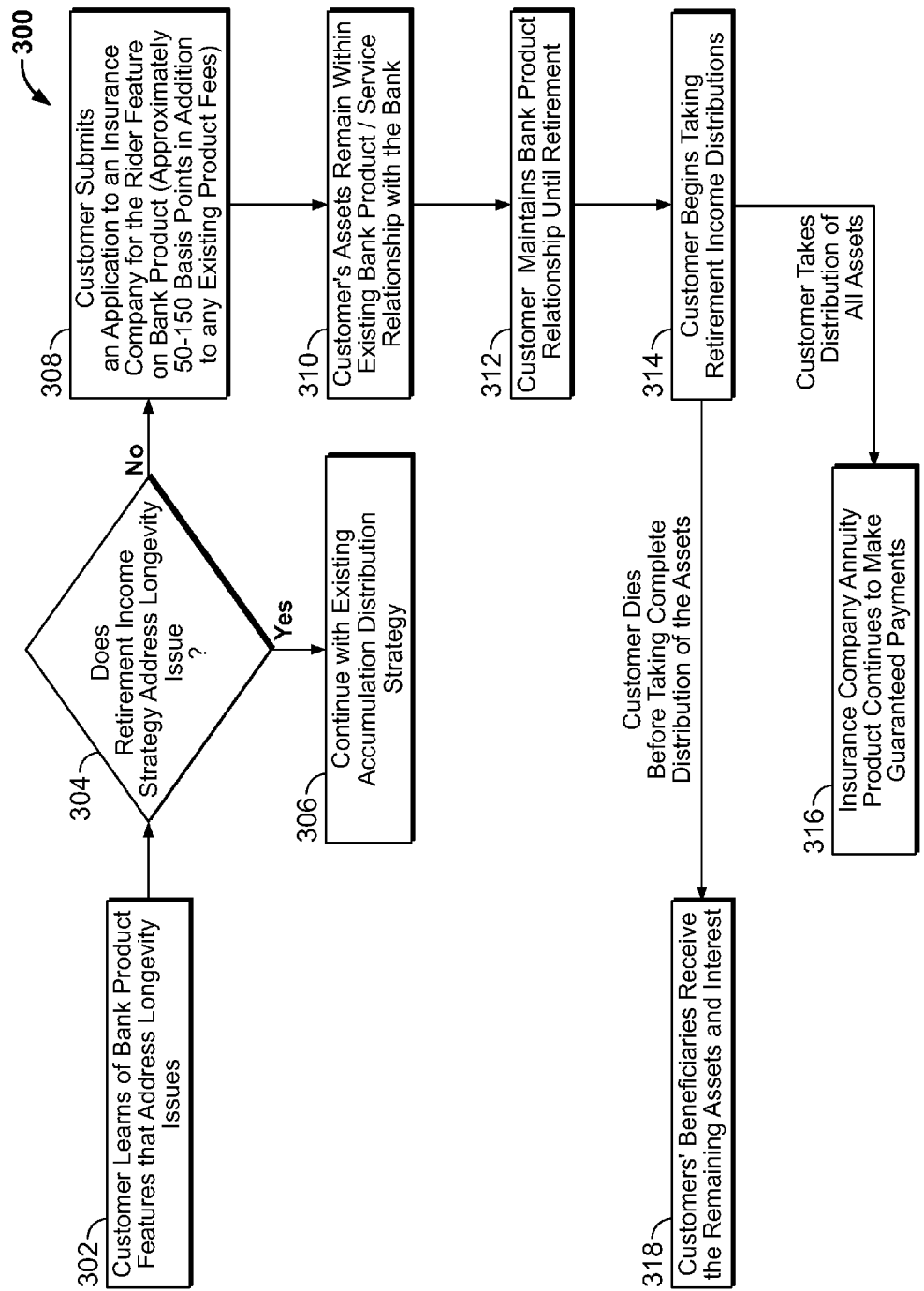
FIG. 3 shows an illustrative process for providing guaranteed income in accordance with the principles of the invention.

Processes in accordance with the principles of the invention may include one or more features of the process illustrated in FIG. 3. For the sake of illustration, the steps of the process illustrated in FIG. 3 will be described as being performed by a "system". The "system" may include one or more of the features of the apparatus that are shown in FIG. 2 and/or any other suitable device or approach. The "system" may be provided by an entity. The entity may be an individual, an organization or any other suitable entity.

FIG. 3 shows illustrative process 300 for guaranteeing income derived from an asset. At step 302, a customer may learn of bank product features that address longevity issues. The product features may be related to one or more of the following bank products: an IRA, a managed money account and a deposit account. The deposit account may be a certificate of deposit, a reverse mortgage asset, a credit card reward accumulation account, a savings account or any other suitable deposit account. The features may be present in a bank product that the customer already "possesses" or can easily acquire.

At step 304, the customer may evaluate whether his retirement income strategy adequately addresses longevity issues. If the retirement income strategy adequately address longevity issues, process 300 may continue at step 306. At step 306, the customer may continue with existing accumulation/distribution strategy.

If at step 304 the customer determines that his retirement income strategy does not adequately address longevity issues, process 300 may continue at step 308. At step 308, the customer may submit an application to an insurance carrier for a guaranteed income rider for the bank product. At step 310, the customer assets are retained within the existing bank product (or within the bank that offers the product in which the assets are held or are to be held). The customer retains his service relationship with the bank in connection with the bank product. At step 312, the customer maintains the bank product and his relationship with the bank until the customer retires. At step 314, the customer begins taking retirement income distributions from the bank product. Typically, such a customer would begin to take such distributions, at the rate of 5% of the assets in the bank product per year, at age 59½. If the customer delays past age 59½, the customer may be entitled to take a higher percentage of the assets.

If the customer takes distribution of all the assets prior to his death, process 300 continues at step 316. At step 316, the insurance company's annuity product makes payments to the customer in place of the distributions from the assets.

If the customer dies before taking complete distribution of the assets (and interest), process 300 continues at step 318. At step 318, the customer's beneficiaries receive the remaining assets (and interest).

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing to a bank customer a guaranteed retirement distribution based on a retail bank product have been provided. Persons skilled in the art will appreciate that the present invention can be practiced by other than the described embodiments, which are presented for purposes of illustration rather than of limitation. The present invention is limited only by the claims that follow.

What is claimed is:

1. A method for providing to a customer a series of payments as part of a guaranteed retirement distribution based on the value of an asset, the method comprising:
using an electronic processing module:
identifying a first value of the asset;
calculating, based on the first value, a first guaranteed distribution payment amount;
making a first payment of the first guaranteed distribution payment amount;
identifying a second value of the asset, the second value being greater than the first value;
calculating, based on the second value, a second guaranteed distribution payment amount greater than the first guaranteed distribution payment amount; and
making a second payment of the second guaranteed distribution payment amount after identifying a third value of the asset, the third value being less than the second value.

2. The method of claim 1 further comprising, when the value of the asset in the retail banking product decreases to an amount at or below a target value, using an electronic transmitter to provide to the insurance carrier a data object having an attribute that indicates that the target value has been reached;
wherein the target value is defined as the maximum value at which an initial distribution benefit is to be paid.

3. The method of claim 2 further comprising using the electronic transmitter to instruct the insurance carrier to transmit to the customer an amount corresponding to the guaranteed distribution payment amount.

4. The method of claim 1 further comprising making the payments using an electronic transmitter to transmit to a fulfillment platform an instruction to transfer to the customer funds corresponding to the payment portion & the asset, the portion corresponding to the guaranteed distribution payment amount.

5. Apparatus for providing to a bank customer a series of payments as part of a guaranteed retirement distribution based on the value of an asset, the apparatus comprising:
an electronic processing module configured to:
identify a first value of an asset;
calculate, based on the first value, a first guaranteed distribution payment amount;
make a first payment of the first guaranteed distribution payment amount;
identify a second value of an asset, the second value being greater than the first value;
calculate, based on the second value, a second guaranteed distribution payment amount greater than the first guaranteed distribution payment amount;
make a second payment of the second guaranteed distribution payment amount after identifying a third value of the asset, the third value being less than the second value; and
wherein an electronic transmitter is configured to provide to an insurance carrier a data object having an attribute that corresponds to the value of the asset.

6. The apparatus of claim 5 wherein, when the value of the asset in the retail banking product reaches a target value, the electronic transmitter is configured to provide to the insurance carrier a data object having an attribute that indicates that the target value has been reached.

7. The apparatus of claim 6 wherein the electronic transmitter is further configured to instruct the insurance carrier to transmit to the customer an amount corresponding to the guaranteed distribution payment amount.

8. The apparatus of claim 5 wherein making the payment using the electronic transmitter is further configured to transmit to a fulfillment platform an instruction to transfer to the customer funds corresponding to the payment.

9. One or more computer-readable media storing computer-executable instructions which, when executed by a processor on a computer system, perform a method for providing to a bank customer a guaranteed retirement distribution, the method comprising:
identifying a first value of an asset;
calculating, based on the first value, a first guaranteed distribution payment amount;
making a first payment of the first guaranteed distribution payment amount;
identifying a second value of the asset, the second value being greater than the first value;
calculating, based on the second value, a second guaranteed distribution payment amount greater than the first guaranteed distribution payment amount; and
making a second payment of the second guaranteed distribution payment amount after identifying a third value of the asset, the third value being less than the second value.

10. The media of claim 9 wherein, when the value of the asset in the retail banking product reaches a target value, the method further comprises using an electronic transmitter to provide to the insurance carrier a data object having an attribute that indicates that the target value has been reached.

11. The media of claim 10 wherein, in the method, the target value is zero.

12. The media of claim 10 wherein the method further comprises using the electronic transmitter to instruct the insurance carrier to transmit to the customer an amount corresponding to the greater of the first and the second guaranteed distribution payment amounts.

13. The media of claim 9 wherein the method further comprises making the payments using an electronic transmitter to transmit to a fulfillment platform an instruction to transfer to the customer funds corresponding to the payment.

14. The method of claim 1 further comprising, using an electronic transmitter, providing to an insurance carrier a data object having an attribute that corresponds to one of the first or the second value of the asset.

15. The apparatus of claim 5 further comprising an electronic transmitter configured to provide to an insurance carrier a data object having an attribute that corresponds to the value of the asset.

16. The method of claim 9 further comprising, using an electronic transmitter, providing to an insurance carrier a data object having an attribute that corresponds to the value.

17. The method of claim 14 further comprising, when the data object is a first data object, using an electronic receiver to receive from the insurance carrier a second data object, the second data object having an attribute that indicates a compliance status of the asset, the compliance status of the asset indicating, whether the asset is in compliance with a term in a guaranteed income rider under which the distribution payment is guaranteed.

18. The apparatus of claim 15 further comprising, when the data object is a first data object, an electronic receiver configured to receive from the insurance carrier a second data object, the second data object having an attribute that indicates a compliance status of the asset, the compliance status of the asset indicating whether the asset is in compliance with a term in a guaranteed income rider under which the distribution payment is guaranteed.

19. The media of claim 16 wherein, when the data object is a first data object, the method further comprises using an electronic receiver to receive from the insurance carrier a second data object, the second data object having an attribute that indicates a compliance status of the asset, the compliance status of the asset indicating whether the asset is in compliance with a term in a guaranteed income rider under which the distribution payment is guaranteed.

* * * * *